No. 657,916. Patented Sept. 18, 1900.
R. W. CONANT.
CALCULATING INSTRUMENT.
(Application filed June 18, 1900.)

(No Model.)

Witnesses.
C. H. Garnett
J. Murphy

Inventor:
Roger W. Conant.
by Jas. H. Churchill
Atty.

UNITED STATES PATENT OFFICE.

ROGER W. CONANT, OF BOSTON, MASSACHUSETTS.

CALCULATING INSTRUMENT.

SPECIFICATION forming part of Letters Patent No. 657,916, dated September 18, 1900.

Application filed June 18, 1900. Serial No. 20,619. (No model.)

*To all whom it may concern:*

Be it known that I, ROGER W. CONANT, a citizen of the United States, residing in Boston, in the county of Suffolk and State of Massachusetts, have invented an Improvement in Calculating Instruments, of which the following description, in connection with the accompanying drawings, is a specification, like letters and figures on the drawings representing like parts.

This invention relates to an instrument for effecting calculations by the relative motion of two or more graduated scales and has for its object to provide a simple and efficient instrument for the purpose specified and one which is substantially small and compact, quickly and easily operated, and can be conveniently carried in the pocket of the operator.

In accordance with this invention the instrument is composed, essentially, of a plurality of members mounted to turn about a common center and having coöperating graduated endless scales on the rims or peripheries of said members. The members of the instrument may be made as cylinders of equal diameter, and the endless graduated scales may be engraved, printed, or otherwise affixed to the peripheries of the said cylinders. These and other features of this invention will be pointed out in the claims at the end of this specification.

Figure 1:
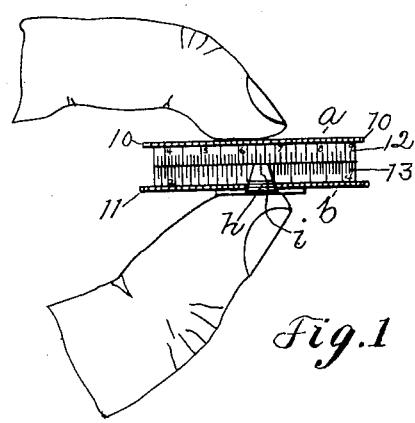
Figure 2:
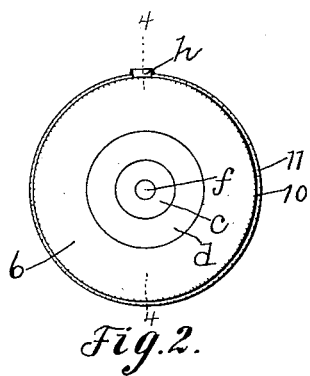
Figure 3:
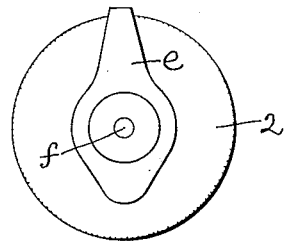
Figure 4:
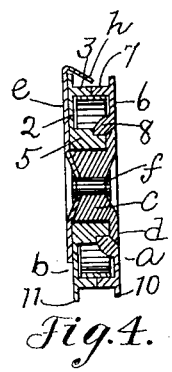
Figure 5:
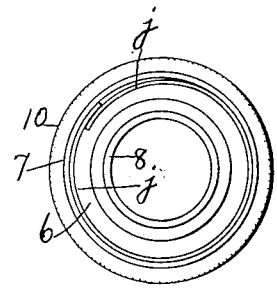

Figure 1 is a side elevation of an instrument embodying this invention; Fig. 2, a top or plan view of the instrument shown in Fig. 1; Fig. 3, an under side view of the instrument shown in Fig. 1; Fig. 4, a section on the line 4 4, Fig. 2; and Fig. 5, a detail to be referred to.

The instrument herein shown as embodying this invention comprises two cylindrical members $a\,b$, which may be designated the "upper" and "lower" members. The members $a\,b$ may be made as herein shown, the lower member $b$ comprising a disk 2, having an annular rim 3, and a central inwardly-projecting hub 5, which is preferably made longer than the width of the rim 3 and is reduced in diameter at its end. The upper number $a$ comprises a disk 6, an annular rim 7, and a hub 8, which fits onto the reduced end of the hub 5. The rims 3 7, as shown, form annular flanges which project from their disks within the circumference of the same to leave radially-extended flanges 10 11, which project beyond the peripheries or rims of the cylindrical members $a\,b$, so as to afford convenient means for turning the said members. The annular flange 11 is preferably made a little larger than the flange 10. The cylindrical rims are preferably made of the same diameter and are provided with endless graduated scales 12 13, which may be engraved, printed, or otherwise affixed on the said rims, which preferably make contact with each other, as represented in Figs. 1 and 4. The hub 5 of the lower cylindrical member $b$ may, and preferably will, have fitted into it a spindle $c$, which may be fastened to said hub so as to turn with it and which is provided with a head $d$, fitted loosely into the upper member $a$. The spindle $c$ carries an arm $e$, which may be mounted to turn on a central portion of the spindle or on a shaft or arbor $f$, carried by said spindle. The arm $e$ may, and preferably will, be provided with a bent finger $h$, which extends over the flange 11, and it may have on it a line $i$, and the said finger may be turned independent of either cylinder and set opposite any graduation of either scale.

The members $a\,b$ and the spring-arm $e$ may be of metal or of any suitable durable material. The spindle $c$ may be made concaved at its opposite ends, as shown in Fig. 4, and the spring-arm $e$ may also have a concaved portion to fit the concavity at one end of the spindle, so as to enable the instrument to be conveniently held between the thumb and forefinger of one hand, as represented in Fig. 1, while the other hand is free to turn the upper cylindrical member $a$ in operating the instrument or to turn both members together by turning the lower member.

The instrument herein shown is used in the same class of work for which the slide-rule is now commonly employed.

The annular flanges 3 7 of the members $a\,b$ form a drum within which a loose spring $j$ may be placed to create more or less friction and prevent the upper member being too easily moved in operating the instrument.

I claim—

1. An instrument of the class described, comprising a plurality of cylindrical members independently revoluble about a common center and provided on their rims or peripheries with coöperating endless scales provided with graduations, substantially as described.

2. An instrument of the class described, comprising a plurality of cylindrical members independently revoluble about a common center and provided on their rims or peripheries with endless scales, and an arm provided with an indication which coöperates with the graduations of the endless scales, substantially as described.

3. An instrument of the class described, comprising a plurality of members revoluble about a common center and having annular flanges extended toward each other, and endless scales carried by said annular flanges, substantially as described.

4. An instrument of the class described, comprising the member $b$ provided with a projecting hub and an annular flange, and the member $a$ having a hub mounted to turn on the hub of the member $b$ and an annular flange extended toward the flange on the member $b$, and endless coöperating scales affixed to the said flanges, substantially as described.

5. An instrument of the class described, comprising a plurality of cylindrical members revoluble about a common center and provided on their rims or peripheries with endless scales, and means to frictionally restrain the movement of one member relative to the other, substantially as described.

In testimony whereof I have signed my name to this specification in the presence of two subscribing witnesses.

ROGER W. CONANT.

Witnesses:
JAS. H. CHURCHILL,
J. MURPHY.